INVENTORS
FLEET E. NUTTALL
JOHN W. RYAN
BY
ATTORNEY

Feb. 15, 1972 F. E. NUTTALL ET AL 3,642,965
METHOD OF REMOVING ESSENTIALLY SEAMLESS FOAMED
PARTS FROM A MOLD BY FLUID PRESSURE
Filed Dec. 23, 1968 2 Sheets-Sheet 2
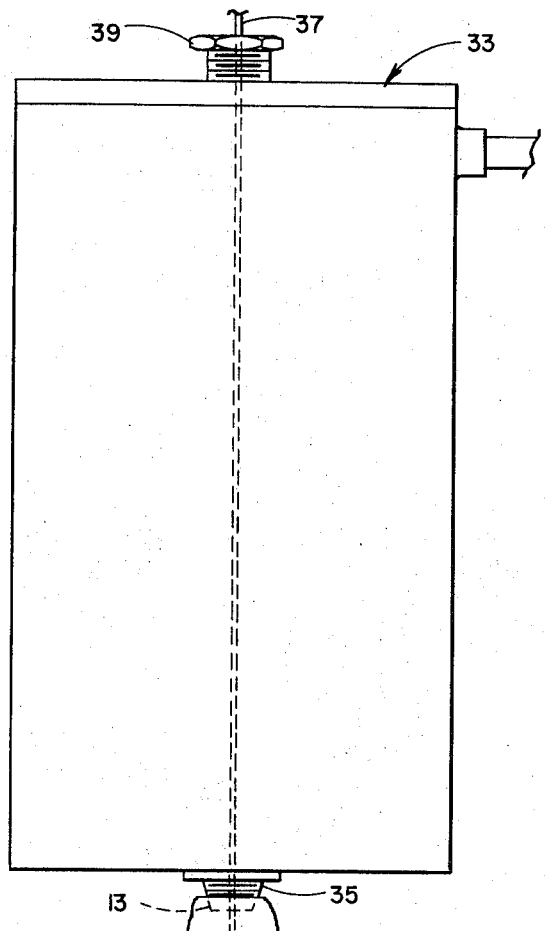
FIG. 2
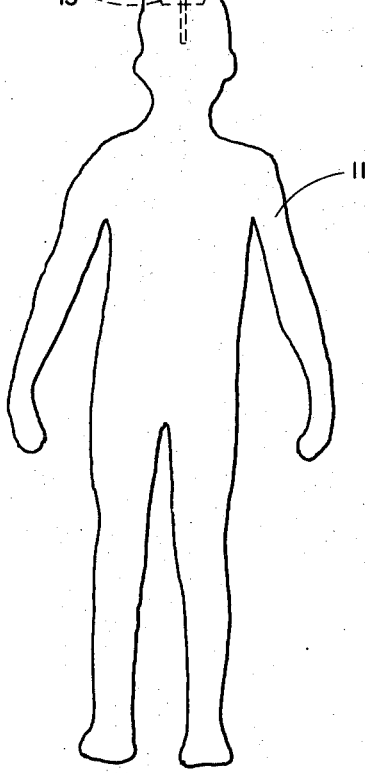
INVENTORS
FLEET E. NUTTALL
JOHN W. RYAN
BY
Max E. Shirk
ATTORNEY United States Patent Office 3,642,965
Patented Feb. 15, 1972

3,642,965
METHOD OF REMOVING ESSENTIALLY SEAMLESS FOAMED PARTS FROM A MOLD BY FLUID PRESSURE
Fleet E. Nuttall and John W. Ryan, Los Angeles, Calif., assignors to Mattel, Inc., Hawthorne, Calif.
Filed Dec. 23, 1968, Ser. No. 786,231
Int. Cl. B29c 7/00; B29d 27/04
U.S. Cl. 264—45
12 Claims

ABSTRACT OF THE DISCLOSURE

A method for removing foamed plastic bodies from the molds in which they are formed comprising opening a portion of the mold to allow the product therein to be affected by external pressure, either placing the mold in a closed chamber or attaching it externally to such chamber, pressurizing said chamber to the point where the foamed product in said mold is sufficiently compressed to remove it from the mold, and subsequently withdrawing the body from the mold within the pressure chamber where, upon the release of the pressure within the chamber, the body fully expands to its formed shape.

SPECIFICATION

Prior to the herein invention, foamed bodies having a complex shape, such as that of a doll, were formed in split molds. A plastisol composition having a blowing agent therein was rotocast or slush molded on the walls of the mold, heated to cause activation of the blowing agent, filling the mold with a foam. The mold was cooled and the finished part removed by opening the mold along a parting line which essentially served to split the mold longitudinally into two halves. This unfortunately leaves a parting line or seam along the formed body where the two halves are joined. This seam must be subsequently removed for appearance purposes. Even after removal, the seam still is somewhat apparent and does not present a desirable and lifelike appearance to the molded article.

Where the body is not in the form of a complex shape, such as just an arm or other limb portion of a body, a closed seamless mold can and has been utilized whereby the foamed product can be easily withdrawn from the wide end of the body which portion has the largest diameter in the entire mold. It is obviously desirable, however, to achieve the same effect of forming an essentially seamless body wherein a complex shape is involved so that the part can be withdrawn from one narrow portion of the mold. In the past, it has been a known practice to utilize essentially closed molds in forming complex shapes, such as spheres and the like, out of plastic or rubber wherein hollow bodies are formed in the mold. The molded article was separated from the mold and removed through a reduction of pressure in the interior thereof. By creating a differential pressure the article would shrink or shrivel so that it could then be subsequently removed from the mold. Others have applied above atmospheric pressure to the exterior surface of the molded article within the mold. However, the molds in such instances were of the conventional split type and the pressure was merely an aid to separate the molded article from the walls to prevent it from sticking and to facilitate the ease of separating the pieces of the mold. The prior art did not appreciate or disclose any method for effectively molding foamed bodies that were not of a hollow construction in a single piece mold. In other words, there was no known method for removing these bodies from such molds when they were of irregular shape.

Thus it is an object of this invention to provide a method to enable the formation of foamed plastic bodies in a continuous solid mold.

A further object of this invention is to provide a novel method for the removal of solid foam bodies from molds through a single opening thereof.

A still further object of this invention is to provide a method for forming solid foamed plastic bodies having a seamless construction.

The above and other objects of this invention are accomplished by providing a continuous closed mold having the desired configuration of the body to be formed, the mold being provided with an opening through which the plastisol composition can be fed and through which the formed body can be subsequently removed. During the formation of the product, the opening in the mold will be plugged so that the body can adequately be formed. After the plastisol composition has been blown to form the foamed body in the mold, the plug is slightly loosened or removed and the mold is placed in a chamber where it is subjected to sufficient pressure to compress the foamed body to the point where it can be easily pulled out of the mold. Alternatively, the mold can be connected external of the pressure chamber and thus form part of it. An airtight fitting can affix the opening in the mold to a corresponding one provided in the chamber.

Upon release of pressure in the chamber, the body resumes its shape in accord with the mold configuration and can be withdrawn from the chamber. In order to accomplish the foregoing, the foamed body should have either (a) an impervious outer skin, (b) an outer skin having a plurality of closed cells therein, or (c) can be comprised of a main foamed body of closed cellular construction. Any one of the three aforegoing conditions will assure that the body will compact under the pressure environment to a point where it can be easily withdrawn from the mold.

It is believed the invention will be better understood from the following detailed description and drawings in which:

FIG. 2 is an elevation view of an embodiment of the invention wherein the doll mold forms part of the pressurization chamber.

Figure 1:
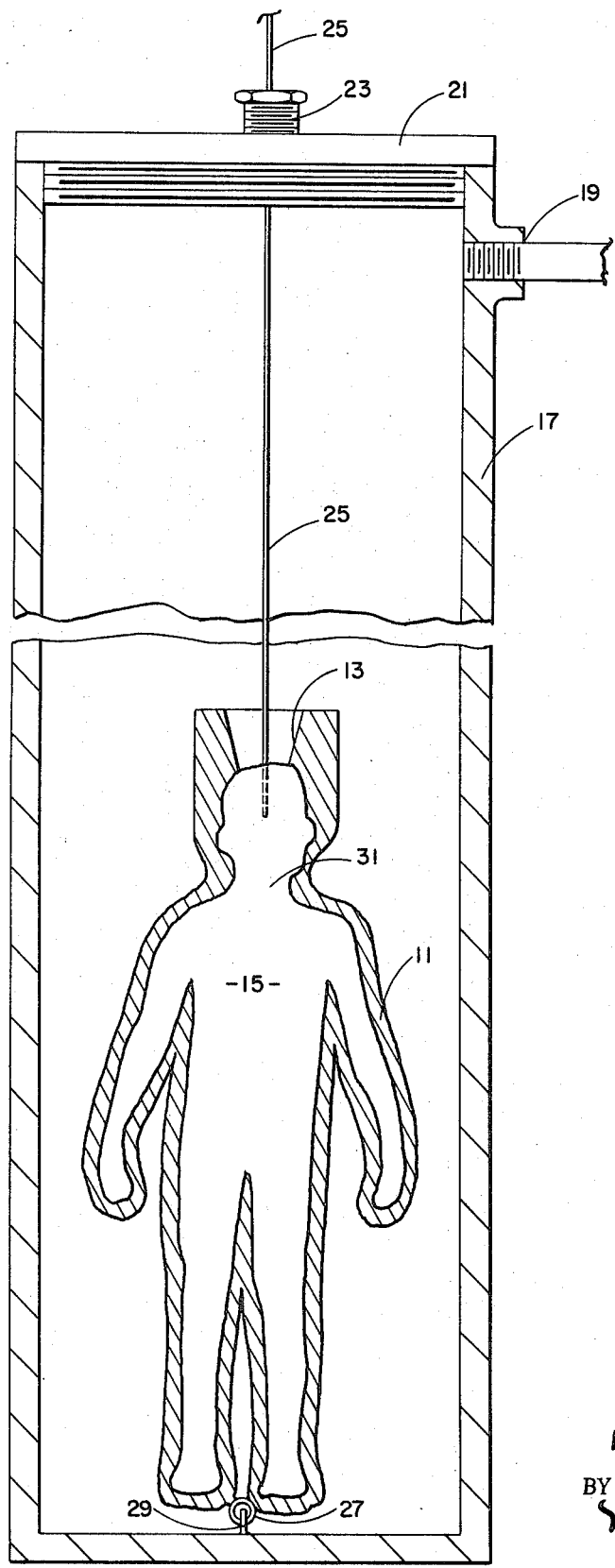
FIG. 1 is a sectional view of a pressurization chamber and a doll mold utilized to practice the method of this invention.

In corresponding application Ser. No. 792,921, filed Jan. 22, 1969 and assigned to the assignee of the present application and now abandoned, there is disclosed a novel foamed body and method of forming same. As particularly disclosed in that application, a single piece doll body can be formed with a lifelike outer skin, wherein a first layer of plastisol containing blowing agent is slush molded or rotocast in the mold. This will eventually form the outer skin on a doll. Next, a layer of plastisol composition containing a blowing agent is formed on the inner surface of the outer layer. When heated, the outer layer or skin layer has only a small amount of blowing agent activated so that it has a relatively small number of pores compared to the main body fill portion which becomes a fully expanded plastisol. The outer skin, as disclosed, is preferably comprised of a closed cellular construction. Additionally, the main body or filled portion in any event is also generally of a closed cellular construction. As further disclosed in the corresponding application, and shown merely by way of example, the formed body having all the limbs of a doll and the general configuration thereof can readily be removed at the head portion of a single mold through a relatively small opening. This is accomplished by placing that mold in a pressure chamber and subjecting it to a pressure sufficient to compact the body to a point where it can be withdrawn from the opening in the mold, as is shown therein. The herein invention is thus particularly directed to that novel method for withdrawing solid foam bodies from continuous molds, as disclosed in the foregoing corresponding patent application.

In order to explain the herein process, it is first pointed out that the foam body can be made by any known conventional process, generally involving the expansion of a conventional plastisol with a blowing agent. As indicated above, a novel method of forming a lifelike outer skin on a foamed body is disclosed in the aforesaid corresponding patent application. However, it is pointed out that the herein invention applies, as has been indicated, to the removal of any type of foamed body from a continuous mold as long as it can be compacted with external pressure. In order to insure this happening, one of the three above-mentioned criteria must exist in the formed foamed body. It can be appreciated that, for example, if a foamed body had an open cellular construction, and no impervious outer skin covering same, pressure would tend to equalize throughout the body and no compaction could be achieved. Thus in performing the herein invention, a mold 11 such as shown in FIG. 1, can be provided in which the plastisol composition or compositions are expanded. Mold 11, as noted, will be a continuous mold having no seams therein. It is provided with an opening 13 at the head end in which a plug (not shown) is utilized during the formation of the foam. The plug can be subsequently removed after the body is formed in the mold or can merely be left ajar allowing external pressure to affect the interiorly formed foamed body 15. After the body 15 has been formed, which is normally at elevated temperatures required to activate the blowing agents, the mold is cooled by, for example, submerging it in water or the like. After the cooling step, the body 15 is then ready for withdrawal from the mold.

A vessel or pressure chamber 17 is provided, having an inlet 19 through which the pressurized air is admitted, and a removable top 21 so that the foam body can be eventually withdrawn therefrom. In the particular embodiment shown, the chamber 17 is provided with a conventional air-tight fitting 23 through which a rod 25 passes. The rod 25 as can be seen extends into the body portion 15 and is cast therein during the molding step of the operation. This is shown for example and explained in corresponding application Serial No. 792,921 and assigned to the assignee of the present application and now abandoned. The plug utilized can be merely slipped off of the rod 25 or just loosened in place prior to removal of the body 15. In an obvious alternative to the foregoing arrangement, the rod 25 can be a separate element that would merely be hooked onto a plug in opening 13 with the plug having means extending into the body 15. Thus, the rod 25 acting on the plug utilized would effectively withdraw the body 15 when it becomes compacted.

The mold 11 is provided with a loop or eye 27 at the bottom end thereof so that it can be affixed by a hook 29 to the vessel 17. This of course allows for the foamed body 15 to be withdrawn from the mold after it has been suitably compressed. The vessel 17 is shown in broken line since it must obviously be of a length equivalent to twice the length of the mold 11 to enable the body 15 to be completely pulled therefrom.

After the mold 11 has been secured within the pressure vessel 17, air is admitted through the inlet line 19 pressurizing the vessel. At a pressure, for example, of about 100 p.s.i., a foamed body 15 can be compressed within the mold 11 to a volume equivalent to about 40% of the unpressurized formed article. As can be appreciated, with an article in the shape of a body such as that shown in the drawing, the neck portion 31 is normally the smallest area through which the body must pass if it is to be withdrawn from the mold. Thus, the pressure in the vessel 17 is raised to a point where it is sufficient to compress the foam body 15 in the mold 11 to a point where it can pass through the neck when rod 25 is pulled upward through the top of the mold. As shown in the drawing, the plug area 13 at the top of the mold is about equivalent to this neck portion. The aforegoing, as can be readily appreciated, provides an essentially seamless body. A small seam might exist around the opening 13 where the plug had been removed. However, this seam particularly in a doll body is minimized because normally a hair or other covering is eventually placed over that area. In other types of molded bodies, one would place this removal port 13 at a place where any seam would be minimized or alternatively make the area as small as possible to enable sufficient withdrawal of the foam body. After the body is completely withdrawn from the mold by pulling rod 25, the pressure is released through line 19 and the top 21 removed so that the product can be withdrawn.

In the embodiment shown in FIG. 2, the doll mold forms part of the pressurization chamber. The mold 11 is affixed to chamber 33 through a fitting 35 which engages the opening 13. A pull rod 37 passes through an airtight fitting 39 in the same manner as described with regard to the device in FIG. 1, and engages the foam body therein. As can be seen, the chamber 33 need only be large enough to accommodate the withdrawn doll body 15. Thus, this embodiment reduces by half the volume required in the chamber, as compared to that shown in FIG. 1.

Obviously, there is wide latitude in the amount of pressure required to compact a foamed body in order to achieve the aforegoing removal results. The amount of pressure needed is dependent upon various factors. These include, for example, the density of the foam body. The greater the density of the body, obviously the less percentage compaction can be achieved. Alternatively, a body having a high degree of porosity, or in other words, a fully expanded foam of closed cells can be compressed to a significant degree of up to at least 50%, utilizing relatively low pressures on the order of 100 p.s.i. A further criteria for the amount of pressure required is the amount of compaction actually needed to achieve a withdrawal. The narrowest portion of the mold might only, for example, require a compaction of 15 to 20 volume percent. In such an instance, much lower pressures on the order of 20 to 30 p.s.i. might be sufficient. However, the aforegoing are all within the skill of the art and can be easily determined for a given mold and foam through trial and error to determine what is the minimum pressure requirement to achieve the compaction needed to withdraw a given shaped body through a particular opening in the mold.

It is believed that the invention will be better understood from the following detailed example which sets forth the formation of a specific foamed body and its subsequent removal from the mold:

EXAMPLE

The skin formulation utilized to form the doll was comprised of the following materials, with amounts given in parts per 100 parts of resin:

| | |
|---|---|
| Polyvinyl chloride | 100.0 |
| Dioctyl phthalate plasticizer | 100.0 |
| Epoxidized tallate plasticizer | 5.0 |
| Pigment | 2.0 |
| Blowing agent | 0.9 |
| Zinc oxide activator | 0.12 |
| Stabilizer | 2.0 |

The specific blowing agent utilized in the above formulation was azodicarbonamide 1,1'-azobisformamide. The stabilizer utilized was Advastab ABC-6, made by the Advance Division of Carlisle Chemical Works, Inc.

The formulation for the main body fill was comprised of the following materials, with amounts given in parts per 100 parts of resin:

| | |
|---|---|
| Polyvinyl chloride | 100.0 |
| Dioctyl phthalate | 72.5 |
| Dioctyl adipate plasticizer | 22.5 |
| Epoxidized tallate | 5.0 |
| Blowing agent | 6.0 |
| Zinc oxide activator | 0.12 |
| Stabilizer | 3.0 |

The mold utilized had the configuration of a doll body and possessed a total volume of 2000 milliliters. The mold was filled with the skin formulation. The mold was then submerged in boiling water for 40 seconds. After removal from the hot water, the mold was then emptied of excess skin formulation. This provided a 100 gram layer of the skin formulation covering the mold's surface to a depth of perhaps 1/32 of an inch. The mold was then heated at 300° F. for 2 minutes in a salt bath in order to set the skin. This was then immediately followed by filling the mold with the fill formulation. At the end of 1½ minutes, the excess fill formulation which did not gel upon contact with the hot skin was drained from the mold. A 270 gram layer of fill formulation on the skin of about ⅛ inch was thus provided. The mold was then attached to a pressure release cap and pressurized to 30 p.s.i. Following pressurization, the mold was submerged in a salt bath which was at 370° F. and kept there for 6½ minutes, during which time the blowing agent was activated and the polymer cured.

At the end of the curing time, the mold was then placed in a 300° bath for 15 seconds to cool the immediate surface of the formed doll, thereby increasing its viscosity and reducing any surface-movement effects as the interior expands during pressure reduction. Following the 300° bath, the mold was then cooled in air while the pressure was released over a period of 2 minutes and the pressure finally reduced to 5 p.s.i. This was done in order to allow the molten plastisol to expand and fill the mold. Following the air cooling and reduction of pressure to 5 p.s.i., the mold was then cooled in cold water for 15 minutes, after which time the pressure cap was removed.

In order to extract the formed cooled product from the mold, the mold was placed in a vessel as shown in the figure, which was pressurized to 100 p.s.i. and the product was withdrawn in accord with the procedure previously described. The vessel was depressurized and the fully expanded body removed therefrom.

What is claimed is:

1. A method of making essentially seamless plastic foamed bodies comprising:
   providing a hollow mold having a solid wall seamless construction with an opening therein,
   forming a resiliently compressible foamed plastic body in and substantially filling said mold, said body having at least one portion too large to pass through said opening,
   subjecting said foamed body while in said mold to fluid pressure on the exterior thereof sufficient to compact said body to the point that it can be withdrawn from said mold through said opening therein;
   withdrawing said body from said mold through said opening while maintaining said pressure thereon; and
   then, relieving said pressure whereby said body is permitted to expand.

2. The method of claim 1 comprising:
   forming said body of a closed cell plastic foam.
3. The method of claim 1 comprising:
   forming said foamed body with an impervious outer layer fused thereon.
4. The method of claim 1 comprising:
   forming said foamed body with a closed cell outer layer fused thereon.
5. The method of claim 1 comprising:
   placing said mold having said foamed body therein in a pressure vessel,
   pressurizing said vessel with a suitable gas to compress said body,
   and withdrawing said compressed body from said mold to within said pressure chamber.
6. The method of claim 5 further comprising:
   depressurizing said vessel to fully expand said compressed body,
   and removing said body from said vessel.
7. The method of claim 1 comprising:
   subjecting said foam body to a pressure of at least 20 p.s.i.
8. The method of claim 1 wherein said forming of said foamed body comprises:
   filling said mold with a suitable plastisol composition containing a blowing agent through said opening provided therein,
   closing said opening,
   and heating said mold to activate said blowing agent to produce said foamed body.
9. The method of claim 8 comprising:
   uncovering at least a portion of said opening prior to subjecting said foamed body to said pressure, said pressure being applied through said opening.
10. The method of claim 1 wherein said mold is in the shape of a complete doll body with said opening at the top of the head portion of said body.
11. The method of claim 1 comprising:
   connecting the opening in said mold to an enclosed chamber after said foamed body has been formed,
   pressurizing said vessel with a suitable gas to compress said body,
   and withdrawing said compressed body from said mold through said opening and into said chamber.
12. A method of making essentially seamless plastic foamed bodies, comprising:
   providing a hollow mold having a mold cavity bounded by a seamless wall, and an opening communicating with said cavity, the transverse dimensions of said opening being less than the corresponding dimension of at least a portion of said cavity;
   forming a resiliently compressible foamed plastic body in and substantially filling said mold;
   subjecting said foamed body, while in said mold, to fluid pressure on the exterior thereof sufficient to compact said body to a size that can be withdrawn from said mold through said opening;
   withdrawing said body from said mold through said opening while maintaining said pressure thereon; and
   then, relieving said pressure whereby said body is permitted to expand.

References Cited
UNITED STATES PATENTS

| | | | |
|---|---|---|---|
| 3,246,443 | 4/1966 | Slemmons | 264—321 |
| 3,307,318 | 3/1967 | Bauman | 264—321 |
| 3,548,451 | 12/1970 | Carmi et al. | 18—5 PX |
| 1,564,310 | 12/1925 | Jones | 264—335 X |
| 2,856,632 | 10/1958 | Rekettye | 264—335 |
| 2,886,852 | 5/1959 | Rose | 264—335 X |
| 3,432,581 | 3/1969 | Rosen | 264—45 |
| 3,456,046 | 7/1969 | Rosen | 264—45 |

OTHER REFERENCES

News Focus, "Condensed Cup." In Chemical and Engineering News, June 10, 1968, p. 131, copy in 264—88.

PHILIP E. ANDERSON, Primary Examiner

U.S. Cl. X.R.

18—2 RA, 5 P, 39; 46—151; 161—161; 264—46, 48, 54, 88, 93, 237, 335, Dig. 14, Dig. 50, Dig. 60